United States Patent
Kircher

(10) Patent No.: US 8,515,703 B2
(45) Date of Patent: Aug. 20, 2013

(54) METHOD FOR CALIBRATING A WHEEL SPEED DETECTION SYSTEM

(75) Inventor: Andreas Kircher, Darmstadt (DE)

(73) Assignee: Continental Teves AG & Co. oHG (DE)

( * ) Notice: Subject to any disclaimer, the term of this patent is extended or adjusted under 35 U.S.C. 154(b) by 223 days.

(21) Appl. No.: 12/745,732

(22) PCT Filed: Dec. 3, 2008

(86) PCT No.: PCT/EP2008/066742
§ 371 (c)(1),
(2), (4) Date: Jun. 2, 2010

(87) PCT Pub. No.: WO2009/071603
PCT Pub. Date: Jun. 11, 2009

(65) Prior Publication Data
US 2010/0262396 A1    Oct. 14, 2010

(30) Foreign Application Priority Data
Dec. 4, 2007   (DE) .......................... 10 2007 058 193

(51) Int. Cl.
*G01P 21/00*   (2006.01)
*G06F 11/30*   (2006.01)

(52) U.S. Cl.
USPC .............. 702/96; 702/97; 702/121; 702/182; 702/183

(58) Field of Classification Search
USPC ...................... 702/96–99, 121–123, 179–189
See application file for complete search history.

(56) References Cited

U.S. PATENT DOCUMENTS

| 5,539,647 | A | 7/1996 | Shibata et al. | |
|---|---|---|---|---|
| 6,405,128 | B1 | 6/2002 | Bechtolsheim et al. | |
| 2002/0124628 | A1 | 9/2002 | Price et al. | |
| 2004/0181320 | A1* | 9/2004 | Kane et al. | 701/19 |
| 2006/0025921 | A1* | 2/2006 | Jung et al. | 701/201 |
| 2009/0326733 | A1 | 12/2009 | Abele et al. | |

FOREIGN PATENT DOCUMENTS

| DE | 196 15 248 | 10/1997 |
|---|---|---|
| DE | 19615248 | * 10/1997 |
| DE | 103 04 126 | 8/2004 |
| DE | 103 06 498 | 8/2004 |
| DE | 103 43 070 | 4/2005 |
| DE | 10 2006 058 567 | 6/2008 |

OTHER PUBLICATIONS

International Search Report for PCT/EP2008/066742 issued Jun. 5, 2009.
German Search Report for DE 10 2007 058 193.0 dated Jan. 13, 2009.

* cited by examiner

*Primary Examiner* — Phuong Huynh
(74) *Attorney, Agent, or Firm* — RatnerPrestia

(57) ABSTRACT

A method for calibrating a wheel speed detection system, comprising at least one wheel speed sensor and at least one electronic control unit. The at least one wheel speed sensor output signal is evaluated in the electronic control unit and the evaluation is adapted to a distance information item which is acquired from a traveled reference distance.

11 Claims, 1 Drawing Sheet

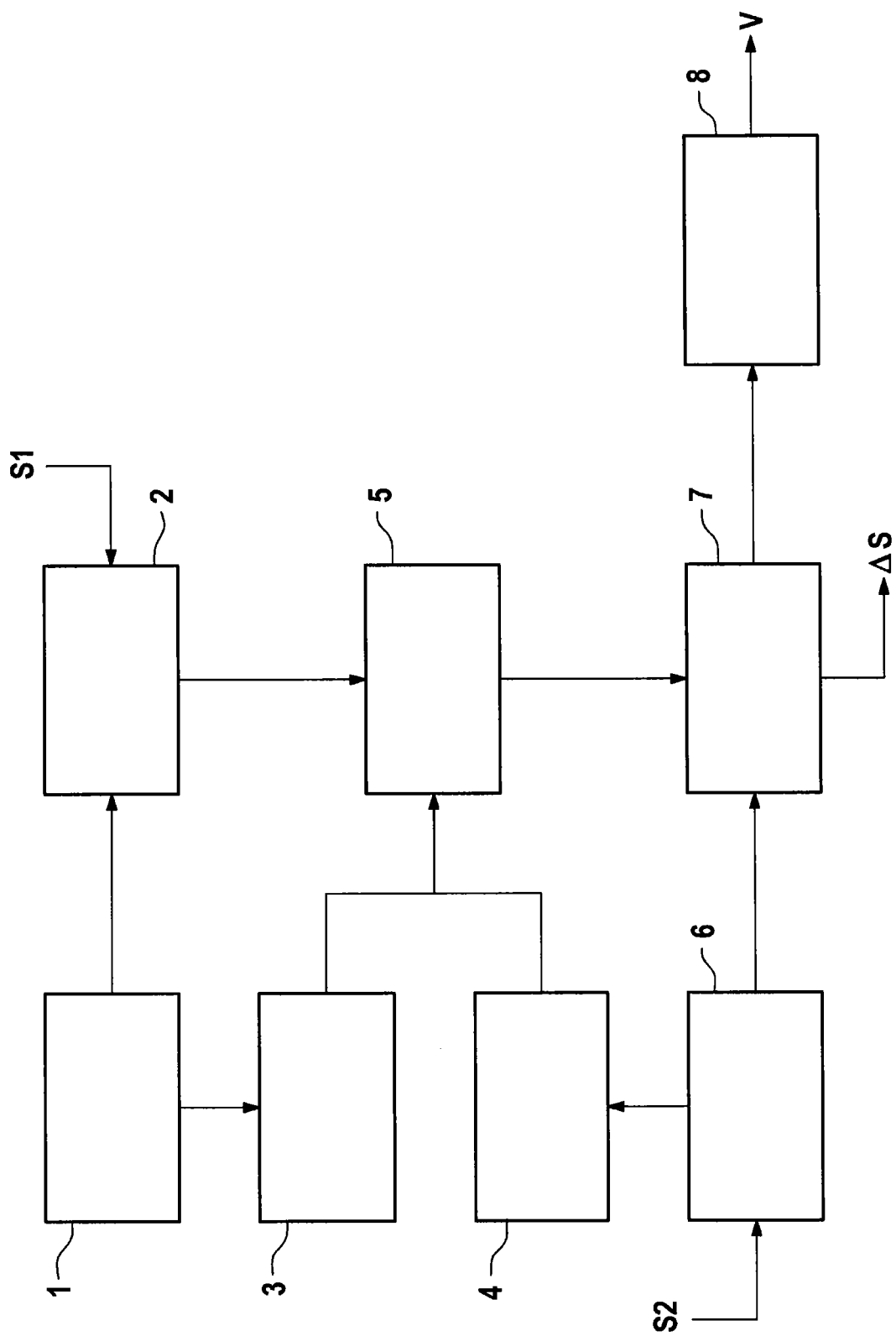

METHOD FOR CALIBRATING A WHEEL SPEED DETECTION SYSTEM

CROSS REFERENCE TO RELATED APPLICATIONS

This application is the U.S. national phase application of PCT International Application No. PCT/EP2008/066742, filed Dec. 3, 2008, which claims priority to German Patent Application No. DE 10 2007 058 193.0, filed Dec. 4, 2007, the contents of such application being incorporated herein by reference.

FIELD OF THE INVENTION

The invention relates to a method for calibrating a wheel speed detection system and to a motor vehicle brake system which is suitable for carrying out all the steps of the method.

BACKGROUND OF THE INVENTION

Wheel speed detection systems are known which evaluate the sensor output signals of the wheel speed sensors of a motor vehicle and calculate the speed of the motor vehicle by means of a stored wheel variable such as, for example, the wheel diameter.

SUMMARY OF THE INVENTION

An object of the present invention is to specify a method with which the evaluation of the wheel speed sensor output signals can be improved in terms of greater accuracy.

The invention relates to the idea of proposing a method for adapting the evaluation of wheel speed sensor output signals in an electronic control unit, in which method a distance information item, which is, in particular, essentially absolute and is based on a traveled reference distance, is used for this adaptation.

An electronic control unit is preferably understood to be a microcomputer, in particular of a motor vehicle-control system, particularly preferably of a motor vehicle brake system.

The evaluation of the wheel speed signals is preferably carried out within the scope of a method which is carried out, in particular, as a software method. This method particularly preferably calculates a vehicle speed and/or a distance traveled within a defined time period and/or carries out further processing of the wheel speed signals and/or makes available further processed wheel speed signals to a method for the indirect monitoring of the tire pressure or loss of tire pressure.

The calibration method of a wheel speed detection system preferably is, or comprises, an adaptation method of evaluation software or further processing software for wheel speed sensor output signals.

A reference distance is preferably understood to be a specific distance which is traveled by the motor vehicle in which the method for calibrating the wheel speed detection system is being carried out, which distance is used to acquire the distance information item which is used as the basis for this calibration or adaptation method. The reference distance must particularly preferably satisfy defined conditions here.

The distance information item of the reference distance may be determined by means of a satellite navigation system, in particular a GPS (Global Positioning System) or Galileo system or a differential GPS or a differential satellite navigation system and/or at least one route infrastructure unit. A route infrastructure unit is expediently understood to be an infrastructure unit which can transmit its (Geo) position coordinates, in some exemplary embodiments by radio, to a motor vehicle. This route infrastructure unit is, for example, what is referred to as a road side unit. Absolute (Geo) coordinates are particularly preferably transmitted to the motor vehicle from the satellite navigation system and/or the route infrastructure unit.

A wheel diameter and/or wheel radius and/or wheel circumference, which is stored in the electronic control unit, is expediently adapted to the distance information item of the reference distance.

This distance information item is preferably determined taking into account map information, in particular by means of a defined reference distance starting point and a reference distance end point.

During the calculation of the distance information item a wheel speed sensor distance, which is preferably determined by means of at least one wheel speed sensor for the traveled reference distance, in some exemplary embodiments on a wheel-specific basis and is subsequently averaged over separately carried-out methods, and a navigation distance, which is determined by means of a satellite navigation system and/or at least one route infrastructure unit, are compared with one another and/or placed in relation to one another. In this context, an adaptation variable, at least taking into account the wheel speed sensor distance and the navigation distance, is calculated and is stored for adaptation of the evaluation of the at least one wheel speed sensor output signal in the electronic control unit and/or is taken into account in this evaluation. The adaptation variable here is particularly preferably the quotient of the wheel speed sensor distance and the navigational distance. In an exemplary embodiment of the present invention, this quotient for adapting the evaluation of the at least one wheel speed sensor output signal is subsequently multiplied by the respective wheel speed and/or the speed, calculated from the respective wheel speed or the wheel speed signal and/or the acceleration and/or a correspondingly calculated distance. The navigation distance is preferably carried out by interpolating a plurality of partial distances which are calculated by means of the satellite navigation system. The navigation distance is alternatively preferably or additionally calculated in the electronic control unit of the wheel speed detection system by adding or subtracting coordinates which are assigned to the starting point and the end point and optionally partial distance points on the reference distance and are made available by the satellite navigation system. Alternatively, this calculation is preferably carried out directly in the satellite navigation system, and the result, in some exemplary embodiments, the navigation distance, is transmitted to the electronic control unit of the wheel speed detection system.

In order to check the plausibility, in some exemplary embodiments, it is expedient to check the wheel speed sensor distances of two or more wheel speed sensors for possible significant differences, and in some exemplary embodiments to carry out an average-forming operation.

During the calculation of the navigation distance, at least two position coordinates of a satellite navigation system or at least two position coordinates of route infrastructure units or combinations of these absolute position sources are expediently, taken into account.

It is expedient that data and information on a traveled distance are used as data and information of a reference distance for carrying out the method only if one or more or all of the following conditions are met when this distance is traveled:

a curvature, which occurs on the traveled distance and is calculated by means of the satellite navigation system and/or a steering angle sensor and/or in some other way, does not exceed a defined curvature limiting value, in particular the motor vehicle should not follow a "lurching path" or there should be no greatly fluctuating coordinates of the satellite navigation system and the changes in the coordinates of the satellite navigation system along the traveled distance in one or more spatial directions must be below a defined limiting value with respect to a defined time or a defined traveled partial distance, no negative or positive acceleration which exceeds a defined limiting value occurs on the traveled distance, no precipitation is detected by a rain sensor and/or the windshield wiper is not actuated, there is no ABS and/or ESP and/or ASC control intervention by the electronic brake system on the traveled distance, the average vehicle speed on this traveled distance is greater than 70 km/h, and/or a defined minimum number of satellites, in some exemplary embodiments 3, 4 or 5, for determining positions is continuously made available to the satellite navigation system during this traveled distance.

The navigation distance is preferably determined by means of an additional electronic control unit and made available to the first electronic control unit for carrying out the calibration method or adaptation method.

During the calculation of the navigation distance, an electronic horizon is preferably taken into account which is proposed, for example, in document U.S. Pat. No. 6,405,128, incorporated herein by reference, and in some exemplary embodiments takes into account coordinates and navigation information relating to distances and/or partial distances which correspond essentially to roads or road sections which can actually be traveled along by a vehicle. In this context, altitude differences or the geographic relief are particularly preferably taken into account.

In some exemplary embodiments it may be that the navigation distance and additional information about the traveled reference distance are provided with a time stamp by the satellite navigation system for their transmission to the electronic control unit. This additional information comprises for example, the starting time, end time, distance length or alternatively a starting time, a distance length with the value zero, and at a later time an end time and a distance traveled. As a result, the electronic control unit does not have to perform any independent evaluation of coordinates of the satellite navigation system.

Within the scope of the method, calibration factors and/or adaptation factors for different wheel diameters are preferably learnt. In this context, the same degree of accuracy of speed and distance may be obtained and made available. If no absolute calibration or adaptation is carried out, a changeover to another tire diameter would, for example, automatically also lead to a deviation in the measured distance or the measured speed.

In some exemplary embodiments of the present invention the method is carried out essentially in parallel for all the wheel speed sensors of the motor vehicle.

One or more embodiments of the invention includes to a computer program product for carrying out all the steps of the method according to aspects of the invention.

Furthermore, one or more embodiments of the invention includes a motor vehicle brake system which is suitable for carrying out all the steps of the method according to aspects of the invention.

The method according to aspects of the invention is preferably provided for increasing the accuracy of all the speed-relevant or speed-dependent variables of a motor vehicle. This also relates, directly or indirectly, to variables derived therefrom such as, for example, a distance traveled or an averaged fuel consumption. The method is particularly preferably used to detect changes in one or more wheel diameters, within the scope of an additional method such as, for example, for determining the tire pressure or detecting a loss of tire pressure or for determining wear of a tire profile or for detecting an incorrectly mounted tire size, for estimating the tire wear by reconciling the air pressure of the tire and the outer diameter of the tire. The method according to aspects of the invention can expediently be used to calculate a curved path or a corresponding curve radius traveled along by the motor vehicle.

The method according to aspects of the invention is repeated continuously or at defined times in order to always be able to obtain an improvement in accuracy by adapting the wheel speed sensor evaluation to the peripheral conditions of the wheel speed detection system.

BRIEF DESCRIPTION OF THE DRAWING

Further preferred embodiments emerge from the following description of an exemplary embodiment with reference to FIGURE.

In the drawing:

FIG. 1 is a schematic illustration of an exemplary embodiment of a flowchart of a method for calibrating a wheel speed detection system.

DETAILED DESCRIPTION OF THE INVENTION

FIG. 1 shows an exemplary method for calibrating a wheel speed detection system. The wheel speed detection system comprises here an electronic control unit ECU and four wheel speed sensors which are connected to this ECU. The satellite navigation system GPS is also connected to the ECU.

In function block 1, an absolute position of the motor vehicle is determined at a time t on the basis of GPS coordinates or on the basis of a known position whose coordinates are stored in a digital map of the GPS. The function block 1 can be implemented here either in the GPS or directly in the ECU which is connected to the GPS. This absolute position is transmitted to function blocks 2 and 3. Furthermore, the sensor signal S1 of the motor vehicle brake system, for example comprising a steering angle, a wheel speed and a speed, is transmitted to function block 2, wherein the wheel speed and the speed are still uncalibrated in the sense of the current method cycle. In function block 2, a plurality of conditions are subsequently checked to determine, for example, whether a negative or positive acceleration which exceeds a defined limiting value occurs on the traveled distance, whether a control intervention of the electronic brake system took place on the traveled distance, whether no precipitation was detected by a rain sensor and/or the windshield wiper was not actuated, whether the average vehicle speed on this traveled distance was higher than 70 km/h, that is to say a town cycle is not occurring or whether a defined minimum number of satellites for determining positions are continuously available to the satellite navigation system during this traveled distance. If these conditions are met, the traveled distance can be considered to be a reference distance and used for the method. If these conditions are not met, it is assumed, for example, that in particular the wheel speed sensor information relating to this traveled distance is subject to undesired destruction, as a result of which it would not be possible to increase the accuracy by evaluating this information.

The function block 3 calculates a navigation distance by summing the GPS coordinates of a distance starting point and distance end point while additionally taking into account positions on partial distances by means of interpolation.

In function block 6, the wheel speed sensor output signal of a wheel speed sensor is incrementally evaluated with respect to traveled partial distances and transmitted to function block 4 in which a wheel speed sensor distance relating to the traveled distance is calculated from these incremental partial distances.

The navigation distance and the wheel speed sensor distance are transmitted to function block 5. The navigation distance is then divided by the wheel speed sensor distance, with this quotient which is calculated in this way forming an adaptation variable or an adaptation factor. The evaluation of the wheel speed sensor output signals is adapted to the distance information item of the traveled reference distance by storing this adaptation variable. This adaptation variable is subsequently multiplied here in function block 7 for a multiplication by the partial distances obtained from function block 6 in order to respectively calculate corrected partial distances ΔS. For these corrected partial distances ΔS, a corrected speed v, which corresponds essentially to a corrected instantaneous speed of the motor vehicle, is respectively calculated in function block 8 by division by the time of the corresponding time interval. The calibration method is carried out, for example, essentially in parallel for all the wheel speed sensors. A plausibility-checking method step (not illustrated) is optionally carried out in which, for example, the wheel speed sensor distances and/or the adaptation variables of all the wheel speed sensors or for all the wheel speed sensors are checked for significant deviations and/or compared with one another.

The invention claimed is:

1. A method for calibrating a wheel speed detection system in a vehicle, the system comprising at least one wheel speed sensor which supplies a wheel speed sensor output signal, and at least one electronic control unit (ECU), the method comprising:
   determining, by the ECU, a sensed distance traveled by the vehicle based on the at least one wheel speed sensor output signal,
   setting, by the ECU, the traveled distance as a reference distance if the following two conditions are satisfied:
      a curvature of the traveled distance does not exceed a predefined curvature limit, the curvature calculated by the ECU based on at least one of satellite navigation information and steering angle information, and
      a negative acceleration or a positive acceleration of the vehicle over the traveled distance does not exceed a predefined acceleration limit; and
   calibrating, by the ECU, the wheel speed detection system based on a quotient computed between a navigation distance determined based on signals received by the vehicle, and the reference distance.

2. The method as claimed in claim 1, wherein the reference distance is determined by means of a satellite navigation system and/or at least one route infrastructure unit.

3. The method as claimed in claim 1, wherein at least one wheel diameter, wheel radius or wheel circumference, which is stored in the electronic control unit, is adapted to the reference distance.

4. The method as claimed in claim 1, wherein the reference distance is determined taking into account map information.

5. The method as claimed in claim 4, wherein taking into account map information is by way of a defined reference distance starting point and a reference distance end point.

6. The method as claimed in claim 1, wherein during the calculation of the reference distance, a wheel speed sensor distance, which is determined by way of at least one wheel speed sensor for the traveled reference distance, and a navigation distance, which is determined by way of a satellite navigation system and/or at least one route infrastructure unit, are compared with one another and/or placed in relation to one another, wherein an adaptation variable is calculated and is stored for adaptation of the evaluation of the at least one wheel speed sensor output signal in the electronic control unit.

7. The method as claimed in claim 6, wherein the adaptation variable is the quotient of the wheel speed sensor distance and the navigational distance.

8. The method as claimed in claim 7, wherein the quotient for adapting the evaluation of the at least one wheel speed sensor output signal is subsequently multiplied by the respective wheel speed and/or the distance, calculated from the respective wheel speed, and/or the speed and/or the acceleration.

9. The method as claimed in claim 6, wherein the navigation distance is carried out by interpolating a plurality of partial distances which are calculated by way of the satellite navigation system.

10. The method as claimed in claim 1, wherein the traveled distance is used as the reference distance for carrying out the method if at least one condition from the following group of conditions is met,
   no precipitation is detected by a rain sensor and/or the windshield wiper is not actuated,
   the average vehicle speed on this traveled distance is greater than 70 km/h, or
   a defined minimum number of satellites for determining positions is continuously made available to the satellite navigation system during the traveled distance.

11. A motor vehicle brake system configured for carrying out all the steps of a method as claimed in claim 1.

* * * * *